US011983772B2

(12) United States Patent
Park et al.

(10) Patent No.: US 11,983,772 B2
(45) Date of Patent: May 14, 2024

(54) COMMUNICATION TECHNIQUES FOR A DISTRIBUTED COMPUTING SYSTEM

(71) Applicant: IEX Group, Inc, New York, NY (US)

(72) Inventors: Robert Park, New York, NY (US); Lucas Tanner Kowalczyk, Brooklyn, NY (US); Lieting (Larry) Yu, Warren, NJ (US)

(73) Assignee: IEX Group, Inc., New York, NY (US)

( * ) Notice: Subject to any disclaimer, the term of this patent is extended or adjusted under 35 U.S.C. 154(b) by 0 days.

(21) Appl. No.: 17/502,722

(22) Filed: Oct. 15, 2021

(65) Prior Publication Data

US 2023/0117329 A1    Apr. 20, 2023

(51) Int. Cl.
*G06Q 40/04* (2012.01)
*G06Q 20/02* (2012.01)
*G06Q 20/40* (2012.01)

(52) U.S. Cl.
CPC .......... *G06Q 40/04* (2013.01); *G06Q 20/023* (2013.01); *G06Q 20/40* (2013.01)

(58) Field of Classification Search
None
See application file for complete search history.

(56) References Cited

U.S. PATENT DOCUMENTS

| 2003/0014464 | A1* | 1/2003 | Deverill | .................... | G06F 9/00 |
| 2021/0390439 | A1* | 12/2021 | Ramasamy | ............ | G06N 10/00 |

FOREIGN PATENT DOCUMENTS

| CA | 3050222 | * | 1/2020 | ............. | G06F 17/00 |

OTHER PUBLICATIONS

Mukherjee, et al., in Data Stream Management System and Capital Market Surveillance, from International Journal of Computer Theory and Engineering, vol. 4, No. 3, in 2012 (Year: 2012).*

* cited by examiner

*Primary Examiner* — Olabode Akintola
*Assistant Examiner* — Brandon M Duck
(74) *Attorney, Agent, or Firm* — Goodwin Procter LLP (57) ABSTRACT

Communication techniques are disclosed for a distributed computing system. The technique may be applied to an inline clearing and settlement messaging protocol whereby a matching engine may issue a transaction request (or settlement request) upon matching a proposed trade, identifying the parties and assets for the trade. A message gateway may validate and transmit the transaction request to a sequencer which sequences the transaction request into a time-accurate event stream so that transaction requests are distributed to relevant parties in chronological order. Each party may respond to the transaction request by simply checking its account to confirm availability of the relevant asset for the proposed trade and issuing a clearance response. The clearance responses form the basis for a transaction response that the message gateway sends to the matching engine to indicate success or failure of the inline clearing and settlement.

17 Claims, 3 Drawing Sheets

COMMUNICATION TECHNIQUES FOR A DISTRIBUTED COMPUTING SYSTEM

FIELD OF THE INVENTION

The present invention disclosed herein relates generally to technological advances in the apparatuses, methods, and systems for efficient communications in a distributed computing system. More particularly, the present inventive communication systems and methods may be adapted for atomically swapping assets where account information is held across a distributed computing system, where in one example the communications techniques may be used to implement low-latency inline clearing and settlement messaging in a distributed electronic trading environment.

BACKGROUND OF THE INVENTION

Electronic trading systems have been one of the most impactful technological innovations in the past few decades. Taking advantage of the ever-evolving computing and communications technologies, modern electronic trading systems comprise fast-running computer servers, vast databases, and high-speed network interfaces that collectively enable millions of individuals and institutions to trade numerous financial products (e.g., stocks, bonds, currencies, commodities, and derivatives) at the same time while offering unprecedented ease, convenience, and flexibility.

Through the rest of this disclosure, stocks and stock trades will be described as illustrative examples although it should be noted that the present invention is applicable to electronic trading of all kinds of securities and other asset types.

All major stock exchanges today provide live-streaming prices and enable near instant execution of orders. Execution is the agreement of a buyer or seller to purchase or deliver a certain security for a specified price, which is typically achieved by a computerized "matching engine" at an exchange applying an algorithm to incoming order messages and order book entries. To date, most technological advances in electronic trading have concentrated on the order-matching or execution stage. But there are two additional steps before a stock trade is finally consummated: clearing and settlement.

Clearing is typically a large-scale, bookkeeping process that takes place between the execution and settlement of stock trades. Once a trade is executed on the market (e.g., on the stock exchange, Investors Exchange, run by IEX Group), the exchange sends details of the executed trade to the National Securities Clearing Corporation (NSCC) which is responsible for matching all buys and sells for accuracy, notifying member firms of the transactions, and arranging the transfer of funds and securities.

Settlement, as the final step in the stock trade, occurs on a predetermined settlement day when the buyer completes payment for the purchased stock and the seller delivers or transfers the stock to the buyer. Typically, settlement for stocks and bonds occurs two days after execution; U.S. Treasuries and other government securities, options and mutual funds settle the day after the execution date; and certificates of deposit, or CDs, settle the same day the trade is executed.

Such conventional approach of immediate execution followed by clearing and settlement occurring hours or days later suffers inherently from counterparty risks. For example, one party (either buyer or seller) to an executed trade could fail to deliver as originally agreed or intended. For example, at settlement time, the buyer may have insufficient funds or the seller of a stock may have already sold the shares originally promised to the buyer. While collaterals could be posted by both parties to guard against the default risk or delivery risk, the collateralization process necessarily increases transactional costs. In addition, with the built-in time delay of the conventional clearing and settlement procedures, the non-defaulting party will often suffer an opportunity cost or a loss from the wasted time which the collateral cannot adequately compensate.

On the other hand, the conventional clearing and settlement methods could not be easily adapted or modified to take place in real-time or near real-time (as opposed to being delayed to hours or days later). One technological obstacle here is that the sheer volume of trades executed by an electronic exchange during the trading hours would require significantly more computing and communication resources to handle the complex messaging between the exchange and one or more third-party clearing and settlement systems. Another technological obstacle is the fact that, in a typical distributed electronic trading environment, the financial accounts involved in an executed (or matched) trade could be hosted on separate servers or databases located far apart, which makes it difficult for a centralized clearing and settlement system to interact with such accounts in a timely and orderly fashion.

Other deficiencies or shortcomings may also exist.

SUMMARY OF THE INVENTION

Embodiments of the present invention overcome at least some of the deficiencies and shortcomings in the prior art approach for the clearing and settlement of executed trades.

According to one particular embodiment, a communication system may be provided in a distributed electronic trading environment, and the communication system may comprise: a message gateway operatively coupled to a matching engine of an electronic exchange, wherein the message gateway is configured to receive first electronic messages carrying transaction requests from the matching engine and to respond to the matching engine with third electronic messages carrying transaction responses; and a sequencer operatively coupled to the message gateway and a plurality of network elements. The sequencer may be configured to: (1) receive and sequence the first electronic messages into a first part of a time-accurate event stream which is shared with at least the plurality of network elements, and (2) receive second electronics messages carrying clearance responses from at least some of the plurality of network elements respectively and sequence the second electronic messages into a second part of the time-accurate event stream which is shared with the plurality of network elements and the message gateway. Communications among the matching engine, the message gateway, the sequencer, and the plurality of network elements may be based on a predetermined messaging protocol which defines respective contents of the first electronic messages, the second electronic messages, and the third electronic messages such that: (a) a transaction request in the first electronic messages comprises parameters of a corresponding proposed trade identifying: (i) at least one first asset for the proposed trade, (ii) at least one second asset to be traded in exchange for the at least one first asset, (iii) at least one first account to contribute the at least one first asset, and (iv) at least one second account to contribute the at least one second asset; (b) a clearance response in the second electronic messages is generated in response to said corresponding transaction request either by the at least one first account indicating a first availability of the at least one first asset or by the at least one second account indicating a second availability of the at least one second asset; and (c) a transaction response in the third electronic messages is generated by the message gateway in response to said corresponding transaction request and based on the corresponding clearance responses from the at least one first account and the at least one second account respectively, wherein said transaction response confirms the proposed trade to the matching engine only if both the at least one first asset and the at least one second asset are indicated as being available.

According to another particular embodiment, a computer-implemented communication method may be provided for a distributed electronic trading environment, and the method may comprise the step of receiving, by a message gateway, a first electronic message carrying a transaction request from a matching engine of an electronic exchange. The transaction request comprises parameters of a corresponding proposed trade identifying: (i) at least one first asset for the proposed trade, (ii) at least one second asset to be traded in exchange for the at least one first asset, (iii) at least one first account to contribute the at least one first asset, and (iv) at least one second account to contribute the at least one second asset. The method may also comprise the steps of: transmitting, by the message gateway, the first electronic message to a sequencer operatively coupled to the message gateway and a plurality of network elements; sequencing, by the sequencer, the first electronic message into a first part of a time-accurate event stream which is shared with at least the plurality of network elements; receiving, by the sequencer, second electronics messages from at least some of the plurality of network elements respectively and sequence the second electronic messages into a second part of the time-accurate event stream which is shared with the plurality of network elements and the message gateway. And the second electronic messages may comprise: (a) a first clearance response generated in response to said transaction request by the at least one first account indicating a first availability of the at least one first asset, and (b) a second clearance response generated in response to said transaction request by the at least one second account indicating a second availability of the at least one second asset. The method may further comprise the steps of: generating, by the message gateway, a transaction response based on the first clearance response and the second clearance response, wherein the transaction response confirms the proposed trade to the matching engine only if the clearance responses indicate both the at least one first asset and the at least one second asset are available; and transmitting, by the message gateway, a third electronic message carrying the transaction response to the matching engine.

BRIEF DESCRIPTION OF THE DRAWINGS

Various embodiments of the present invention taught herein are illustrated by way of example, and not by way of limitation, in the figures of the accompanying drawings, in which.

DETAILED DESCRIPTION OF THE INVENTION

Embodiments of the present invention provide a streamlined communication technique to atomically swap assets where account information is held across a distributed computing system. One exemplary application of this inventive communication technique is the enablement of inline clearing and settlement of electronic trades in real-time or near real-time. Through a simple yet efficient messaging protocol and by taking advantage of an event stream sequencer, as described in more detail below, a matching engine may quickly query accounts which are parties to a proposed trade to confirm availability of funds and/or assets to be committed to the trade; the matching engine may then issue a trade report accordingly if the trade can be cleared and settled.

Figure 1:
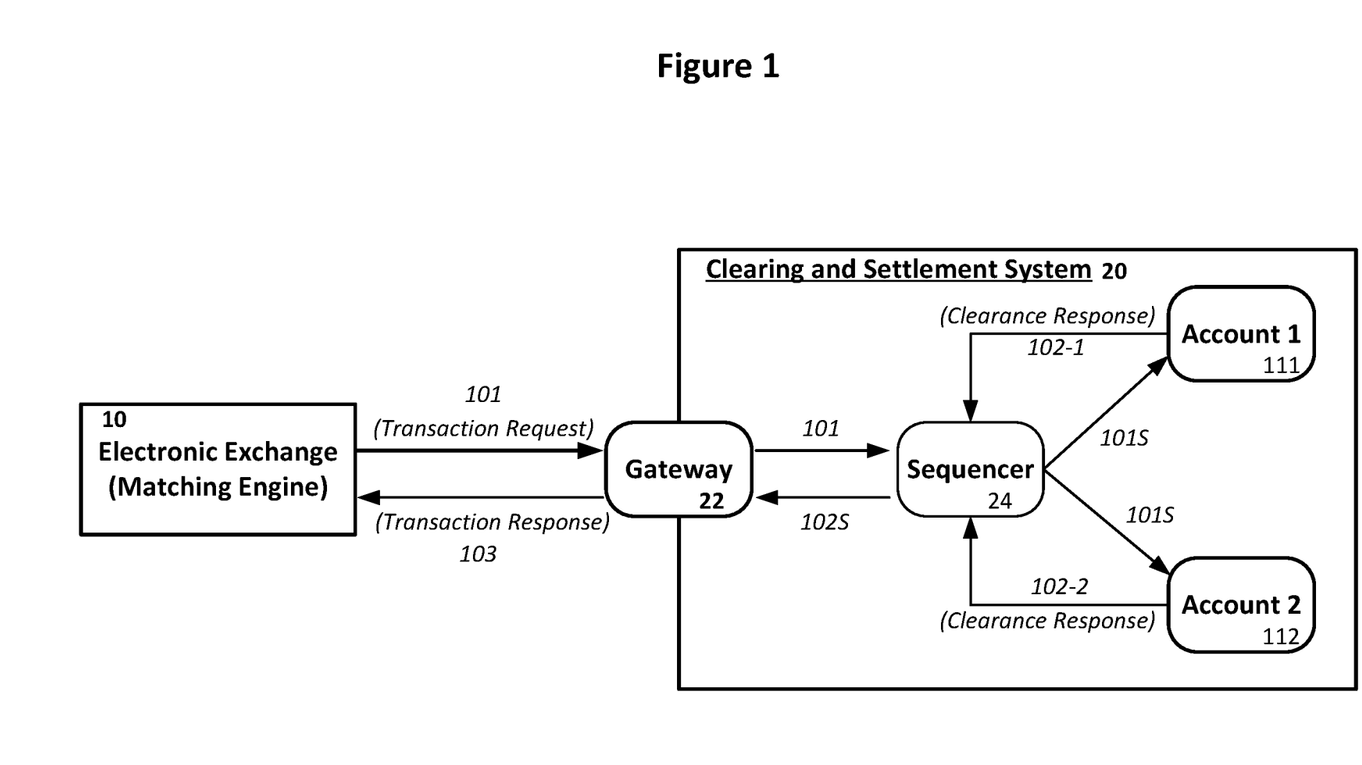
FIG. 1 is a diagram illustrating an exemplary communication system and method for inline clearing and settlement messaging in a distributed electronic trading environment according to some embodiments of the present invention.

Referring to FIG. 1, there is shown a diagram illustrating an exemplary communication system and method for inline clearing and settlement messaging in a distributed electronic trading environment according to some embodiments of the present invention.

The exemplary communication system may include a message gateway 22 which is operatively coupled to a matching engine 10 of an electronic exchange. The message gateway 22 may be a specialized piece of computing or network equipment and/or running specially designed software program for handling communications of electronic messages with the matching engine 10. When it executes a trade, the matching engine 10 may transmit a first message 101 carrying a corresponding transaction request to the message gateway 22. And, the message gateway 22 is configured to respond to the first message 101 with a third message 103 carrying a transaction response 103 to the matching engine 10.

Such communications between the matching engine 10 and the message gateway 22 may be based on a predetermined messaging protocol which defines, among other things, the content of the first message 101 or the transaction request. For example, according to some embodiments of the present invention, the transaction request may comprise the following information for a typical stock trade involving two parties, Buyer and Seller:

Request ID
Transaction Time
Ticker of the stock to be traded
Number of shares to be traded
Price of shares to be traded
Buyer Account ID
Seller Account ID Although the matching engine 10 has identified both Buyer and Seller as well as the trade parameters (i.e., the stock ticker, volume, and price), what is specified in the transaction request is still a proposed trade, because whether the trade could be ultimately consummated depends on both parties possessing the respective assets (i.e., Seller having the shares of stock and Buyer having the funds) at the time of settlement. The purpose of the transaction request is to quickly and conclusively obtain confirmation from the parties to the proposed trade that the relevant assets are available to be committed to the trade and to settle the trade.

According to some embodiments of the present invention, the proposed trade may involve more than two counterparties instead or effectively be a combination of trades to be executed together. In that case, an exemplary transaction request may have a data structure including the following fields:

Request ID
Transaction Time
Ticker1
   Number of shares to be traded
   Price of shares to be traded
   Buyer1 Account ID
   Seller1 Account ID
Ticker2
   Number of shares to be traded
   Price of shares to be traded
   Buyer2 Account ID
   Seller2 Account ID
Ticker3
   Number of shares to be traded
   Price of shares to be traded
   Buyer3 Account ID
   Seller3 Account ID
etc. . . .

Such multi-party trades may be particularly useful for the creation or redemption of exchange traded fund (ETF) units.

Thus, the transaction request in the first message 101 will clearly and succinctly identify at least both the assets to be exchanged in the proposed trade and the parties (i.e., accounts) to contribute such assets. In addition, the Request ID may uniquely identify the transaction request and the Transaction Time marks when the trade is matched or executed or when the transaction request is issued by the matching engine 10.

The message gateway 22 is also operatively coupled to an event stream sequencer 24. Exemplary embodiments of such a sequencer 24 were disclosed in the commonly owned U.S. Pat. Nos. 10,678,694 and 10,901,905, both titled "System and Method for Creating Time-Accurate Event Streams," which are incorporated by reference herein in their entireties. The sequencer 24, which may be implemented with either a single sequencer or a group of sequencers (as described in the above-listed, commonly owned patents), is particularly useful in a distributed computing system such as the electronic trading environment contemplated in connection with the present invention: the sequencer is designed and configured to place all events or messages in chronological order and to generate a time-accurate event stream accessible to the applications that need to consume such events or messages.

Such input messages for the sequencer 24 may include the first electronic message 101 (or at least the transaction request therein). And the event stream, including at least the content of the first electronic message 101, may be made available to the message gateway 22 as well as a plurality of network elements in the distributed electronic trading environment. The network elements, such as various hardware and software instances related to trading, brokerage, accounting, clearing/settlement, and other financial management functions, may be dispersed over one or more computers and/or networks. According to some embodiments of the present invention, some of the network elements may be associated with various accounts holding funds, securities, or other assets on behalf of trading parties (e.g., individual investors, brokerage firms, investment banks etc.) and are configured to respond to the sequenced first message (being part of the event stream and identified as 101S in FIG. 1) in accordance with the predetermined messaging protocol as well.

For example, each network element may receive and examine the transaction request to determine whether an account associated with the network element is identified in the transaction request (e.g., in the Buyer Account ID or Seller Account ID fields). If not, then the transaction request is irrelevant to that network element and can be disregarded. If an account associated with the network element matches the Buyer Account ID or Seller Account ID, then the network element may be required under the messaging protocol to respond to the sequenced first message 101S with a second electronic message.

For instance, once the network element 111 associated with Account 1 determines that the Seller Account ID in the transaction request matches Account 1, the network element 111 may immediately check Account 1 to determine whether it has the asset to be sold in the proposed trade; and the network element 111 may then respond with a second message 102-1 comprising a clearance response that indicates whether the relevant asset is available for the proposed trade. According to one particular embodiment of the present invention, the clearance response may include information not much more than a simple "Ack" or "Nack" signal, where "Ack" means the asset is available and "Nack" means the asset is unavailable.

Similarly, once the network element 112 associated with Account 2 determines that the Buyer Account ID in the transaction request matches Account 2, the network element 112 may immediately check Account 2 to determine whether it has the fund (e.g., sufficient quantity of U.S. dollars) to pay for the asset in the proposed trade; and the network element 112 may then respond with a second message 102-2 comprising its own clearance response that indicates whether the relevant fund is available for the proposed trade. This clearance response may also include a simple "Ack" or "Nack" signal, where "Ack" means the fund is available and "Nack" means the fund is unavailable.

It should be noted that the network elements need not be co-located or connected within the same communication network and that the information of the relevant accounts does not have to be on the same computer or network. Instead, the account information may reside on different computers or networks across a distributed computing system. But the communication or messaging technique according to the present invention can still allow for accurate atomic swaps among the widely dispersed accounts within a reasonable amount of time.

Such second messages (102-1, 102-2) may be transmitted to the sequencer 24 which sequences these messages into part of the event stream to be shared with the message gateway 22 and the other network elements in the distributed electronic trading environment.

From each network element's or account's standpoint, once it has both issued an "Ack" clearance response and received an "Ack" clearance response from a counterparty (or all counterparties in a multi-party trade), the corresponding proposed trade is confirmed and settled, and the relevant asset in its possession will be committed to the trade. However, if a network element ended up either issuing a "Nack" response or receiving a "Nack" response from a counterparty, then the corresponding proposed trade cannot be confirmed and the relevant asset is not committed.

After sequencing, the second messages (102-1, 102-2) or contents thereof may become a part of the event stream (represented by messages 102S in FIG. 1). The message gateway 22 may receive the messages 102S and process them, based on the predetermined messaging protocol, to generate a transaction response. The transaction response may be generated based on the clearance responses carried in the messages 102S, where only an "Ack" signal from both Account 1 and Account 2 may lead to an indication of trade confirmation or settlement in the transaction response. The transaction response may be transmitted to the matching engine 10 in a third electronic message 103. Only upon receiving a confirmatory transaction response will the matching engine 10 issue a trade report.

According to preferred embodiments of the present invention, the matching engine 10 and/or the message gateway 22 may enforce a requirement (e.g., as part of the messaging protocol) that the transaction response must be received by the matching engine 10 within a specified period of time after the issuance of the transaction request. That is, to ensure the clearing and settlement procedure for a proposed trade is completed expeditiously or at least within a reasonable time window, the message gateway 22 may be configured to always generate and send back the transaction response within a time period which could be a few seconds or up to 80-90 seconds. Whether the time limit is reached would depend on how soon the relevant network elements or accounts reply with their respective clearance responses. According to one embodiment of the present invention, any failure for the network elements or message gateway to timely respond to a transaction request may be treated as the basis for rejecting the transaction request. In that case, it may not be necessary for the message gateway to generate or transmit a transaction response, and the message gateway or matching engine could simply rely on a time-out to know that the corresponding proposed trade has failed.

According to some embodiments of the present invention, in order to implement the above-described time-out feature, the system may preferably use a "clock" application to inject regular time messages into the sequenced event stream. For example, the sequenced stream could contain a clock heartbeat every X milliseconds. Then, applications computing a time-out value could use these sequenced clock messages to measure time (instead of, for example, using their internal clock to measure time passed). As a result, the applications in the distributed system will be able to measure time in exactly the same way by only using the clock messages in the consistent sequenced stream input and without relying on the applications' internal state. This allows any application to consider the passing of Y number of sequenced clock messages before an acknowledgement to be equivalent to a "Nack" response, thereby cancelling the proposed trade.

Figure 2:
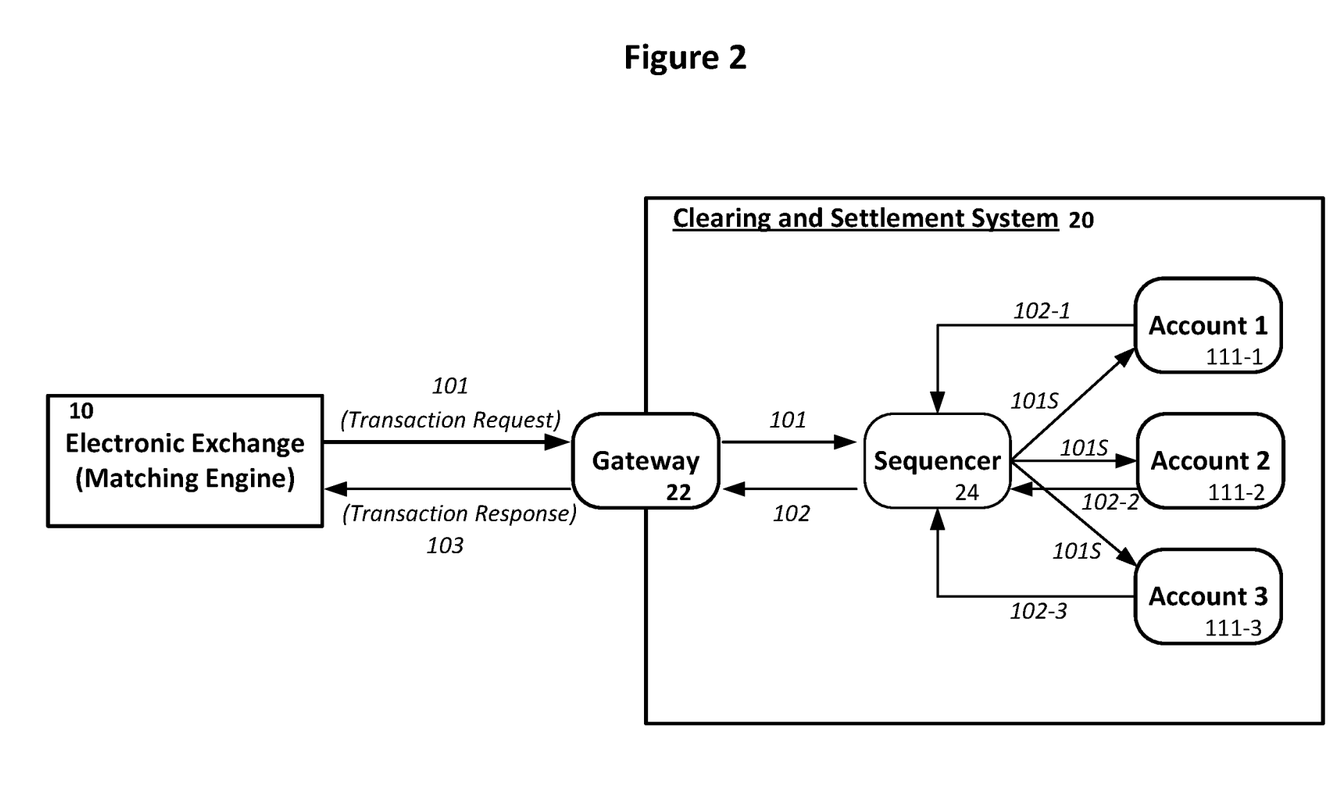
FIG. 2 is a diagram illustrating another exemplary communication system and method for inline clearing and settlement messaging in a distributed electronic trading environment according to other embodiments of the present invention.

FIG. 2 is a diagram illustrating another exemplary communication system and method for inline clearing and settlement messaging in a distributed electronic trading environment according to other embodiments of the present invention. While involving substantially the same setup of the message gateway 22 operatively coupled to the matching engine 10 and the sequencer 24, this example shows a scenario where a proposed trade requires more than two parties or accounts. Although only three accounts are shown in FIG. 2 (i.e., 111-1, 111-2, 111-3), the multi-party trade could potentially be among many more parties or accounts. Under the messaging protocol, the transaction request will identify each of the multiple buyer-seller pairs (e.g., with Buyer Account IDs and Seller Account IDs) as described above. According to some embodiments of the present invention, the proposed trade may be confirmed only if each of the accounts identified in the transaction request replies with "Ack" in its clearance response. According to other embodiments, the transaction request may specify one or more trading conditions such as one that allows a buyer-seller pair in the multi-party trade to be cleared and settled without confirming all the buy-sell components of the trade.

Figure 3:
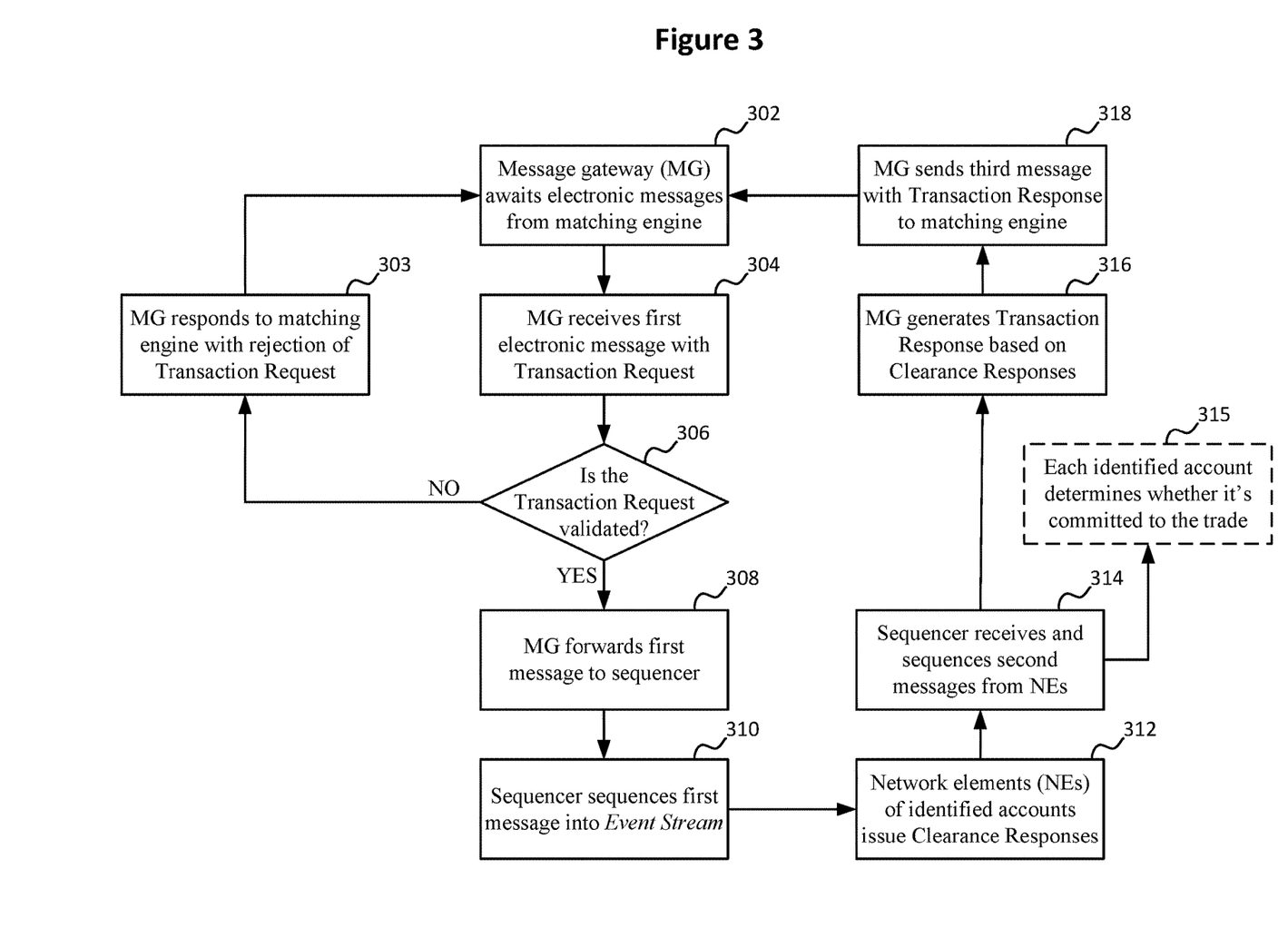
FIG. 3 is a flowchart illustrating an exemplary process for inline clearing and settlement messaging according to an embodiment of the present invention.

Referring now to FIG. 3, there is shown a flowchart illustrating an exemplary process for inline clearing and settlement messaging according to an embodiment of the present invention. This flow chart summarizes the sequence of events or steps taking place in the inventive systems such as those illustrated in FIG. 1 and FIG. 2.

In Step 302, a message gateway may await electronic messages from a matching engine of an electronic exchange system. The message gateway may be disposed between the electronic exchange system and a clearing and settlement system and, according to embodiments of the present invention, could be a part of either system or be independent from both systems. The message gateway may listen for electronic messages carrying transaction requests (or settlement requests) from the matching engine.

In Step 304, the message gateway may receive from the matching engine a first electronic message which contains a transaction request. The matching engine may have issued the transaction request upon matching at least one buy order with at least one sell order submitted to the electronic exchange. The transaction request may be formulated according to a messaging protocol and include data fields specifying parameters of a proposed trade involving the matched orders, for example, by identifying at least the assets to be traded and the parties to the trade (typically the ones who submitted the now-matched orders).

In Step 306, the message gateway may validate the transaction request by determining whether its content and format meet the requirements of the messaging protocol. If not, the process may loop to Step 303 where the message gateway may respond to the matching engine with a rejection of the transaction request. If the transaction request is validated in Step 306, then the message gateway may forward the first electronic message to an event stream sequencer in Step 308.

Then, in Step 310, the sequencer may sequence the first electronic message or its content (i.e., the transaction request) into a part of an event stream. As a critical element in the distributed electronic trading environment, the sequencer may keep events and messages in a proper chronological order by generating a globally time-accurate event stream that is made available to various network elements in the distributed environment. In the context of the present invention, the sequencer will keep at least the transaction requests (issued from time to time by the matching engine and forwarded by the message gateway) in the order as they are received. This turns out to be an important function as will be explained below.

Next, in Step 312, those network elements associated with the parties or accounts identified in the transaction request may respond by issuing clearance responses. Each of such accounts may quickly conduct a self-check to confirm whether it has the relevant asset it is expected to contribute to the proposed trade and then generate an essentially binary response. For example, an "Ack" response confirms availability of the relevant asset while a "Nack" response indicates the relevant asset is unavailable for the proposed trade.

The clearance responses may be included in second electronic messages issued by the relevant network elements respectively, and the second messages may be received and sequenced by the sequencer in Step 314. As a result, the second electronic messages also become a part of the event stream which is shared among the network elements and the message gateway.

In Step 315, each account identified in the transaction request may determine whether it is committed to the proposed trade based on its own clearance response as well as one or more clearance responses received from counterparties via the event stream sequencer. For example, a seller account that has issued an "Ack" response to the transaction request and has received an "Ack" response from the buyer account will have to commit the relevant asset in the seller account to the proposed trade. If the seller account has issued an "Ack" response to the transaction request and then received one or more additional transaction requests concerning some or all of the asset identified in the first request, the seller account will have to queue the additional transaction request(s) until it has received a clearance response from the buyer identified in the first request.

Here, it may be appreciated why the sequencer is important to the inline clearing and settlement procedure disclosed herein. By keeping the transaction requests in chronological order, the sequencer can help avoid deadlock situations such as the one described below. In one scenario, the matching engine may have issued transaction request T1 first and then issued transaction request T2, both identifying Account A and Account B; but, without the sequencer, Account A might receive T1 first and then T2 while Account B might receive T2 first and then T1. A deadlock may ensue because: Account A will respond to T1 first and queue T2 while waiting for Account B's response on T1; Account B will respond to T2 first and queue T1 while waiting for Account A's response on T2. With the sequencer, however, this type of deadlocks will not occur because both Account A and Account B will receive T1 first and then T2. If Account A recognizes that T2 affects at least some of the same asset as T1, then Account A will queue T2 pending the receipt of a clearance response from Account B concerning T1.

In Step 316, the message gateway may generate the transaction response based on the clearance responses in the second electronics messages that have been sequenced and shared by the sequencer. The message gateway may confirm whether each party to the proposed trade (i.e., each account identified in the transaction request) has indicated, in its corresponding clearance response, that the asset (e.g., stock or fund) it is expected to contribute is still available. Only when all the accounts have confirmed availability of their respective assets will the message gateway confirm the proposed trade as being cleared and settled in the transaction response.

Then, in Step 318, the message gateway may transmit a third electronic message containing the transaction response to the matching engine. As a result, the matching engine will be informed whether the proposed trade specified in the transaction request is now cleared and settled, and a trade report could be generated accordingly and sent to the relevant parties.

According to an alternative embodiment of the present invention, the message gateway may be configured to simply pass through the third electronic messages with the individual clearance responses to the matching engine. In that case, the clearance responses from the relevant parties may be considered to collectively form the transaction response; and the matching engine or an associated component or module, instead of the message gateway, may synthesize the clearance responses.

According to embodiments of the present invention, the message gateway is expected to send the transaction response to the matching engine within a predetermined period of time after receiving the corresponding transaction request. In other words, the matching engine cannot wait indefinitely for a proposed trade to be cleared and settled. According to one embodiment, either the message gateway will send a transaction response at the end of the predetermined period of time (e.g., 60-90 seconds or less) confirming failure of the clearing and settlement or the matching engine may treat the trade as having failed upon a time-out.

According to further embodiments of the present invention, the inline clearing and settlement messaging techniques described above may be implemented at least in part with blockchain technology. That is, some or all of the electronic messages (or content thereof) exchanged among the matching engine, message gateway, sequencer, and network elements (parties/accounts) may be recorded in substantial real-time on a distributed ledger and could drive the execution of smart contract(s). For example, each account's clearance response may be entered into the distributed ledger; such entries may trigger elements of at least one smart contract related to the settlement and automatically lead to transfer of assets upon recording confirmatory responses from all parties/accounts.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the patent claims ultimately issued from this application.

The invention claimed is:

1. A communication system for a distributed electronic trading environment, the communication system comprising:
   a message gateway operatively coupled to a matching engine of an electronic exchange, wherein the message gateway is a specialized piece of equipment and/or running specially designed software program for handling communications of electronic messages with the matching engine and the message gateway is configured to receive first electronic messages carrying transaction requests from the matching engine and to respond to the matching engine with third electronic messages carrying transaction responses; and
   an event stream sequencer operatively coupled to the message gateway and a plurality of network elements hosting a plurality of accounts, the event stream sequencer being configured to convert electronic messages received from the message gateway and the plurality of network elements to a time-accurate event stream by:
      (1) receiving the first electronic messages from the message gateway,
      (2) sequencing the first electronic messages into a first part of the time-accurate event stream which is shared with at least the plurality of network elements,
      (3) receiving second electronic messages from the message gateway, the second electronic messages carrying clearance responses from at least some of the plurality of network elements respectively, and
      (4) sequencing the second electronic messages into a second part of the time-accurate event stream which is shared with the plurality of network elements and the message gateway;
   wherein communications among the matching engine, the message gateway, the event stream sequencer, and the plurality of network elements are based on a predetermined messaging protocol which defines respective contents of the first electronic messages, the second electronic messages, and the third electronic messages such that:
- (a) a first transaction request in the first electronic messages comprises parameters of a corresponding proposed trade identifying:
  - i) at least one first asset for the proposed trade,
  - ii) at least one second asset to be traded in exchange for the at least one first asset,
  - iii) at least one first account of the plurality of accounts to contribute the at least one first asset, and
  - iv) at least one second account of the plurality of accounts to contribute the at least one second asset,
- (b) a clearance response in the second electronic messages is generated in response to said first transaction request either by the at least one first account indicating a first availability of the at least one first asset or by the at least one second account indicating a second availability of the at least one second asset, and
- (c) a transaction response in the third electronic messages is generated by the message gateway in response to said first transaction request and based on the corresponding clearance responses from the at least one first account and the at least one second account respectively, wherein said transaction response confirms the proposed trade to the matching engine only if both the at least one first asset and the at least one second asset are indicated as being available, wherein a second transaction request, identifying the first account and issued by the event stream sequencer subsequent to issuance of the first transaction request, is queued by the first account until (i) the first account receives the clearance response generated by the second account, (ii) a predetermined time period elapses, or (iii) the first account receives the transaction response generated by the message gateway.

2. The communication system according to claim 1, wherein the message gateway is further configured to validate the first transaction request based on the predetermined messaging protocol.

3. The communication system according to claim 1, wherein the message gateway is further configured to respond to the matching engine with said transaction response within a predetermined time period after receiving said first transaction request.

4. The communication system according to claim 3, wherein the predetermined time period is shorter than ninety (90) seconds.

5. The communication system according to claim 1, wherein only those of the plurality of network elements associated with the at least one first account or the at least one second account will respond with clearance responses.

6. The communication system according to claim 1, wherein the at least one first account becomes committed to the proposed trade after (1) issuing at least one first clearance response indicating the at least one first asset as being available and (2) receiving at least one second clearance response issued by the at least one second account indicating the at least one second asset as being available.

7. The communication system according to claim 1, wherein (a) at least one message of the first electronic messages, the second electronic messages, or the third electronic messages or (b) at least some content of the at least one message is recorded in a distributed ledger based on a blockchain technology.

8. The communication system according to claim 7, wherein the recorded at least one message or the recorded at least some content triggers execution of a smart contract in accordance with the blockchain technology.

9. A computer-implemented communication method for a distributed electronic trading environment, the method comprising:
receiving, by a message gateway, a first electronic message carrying a first transaction request from a matching engine of an electronic exchange, wherein the message gateway is a specialized piece of equipment and/or running specially designed software program for handling communications of electronic messages with the matching engine, and wherein the first transaction request comprises parameters of a corresponding proposed trade identifying:
  i) at least one first asset for the proposed trade,
  ii) at least one second asset to be traded in exchange for the at least one first asset,
  iii) at least one first account to contribute the at least one first asset, and
  iv) at least one second account to contribute the at least one second asset;
transmitting, by the message gateway, the first electronic message to an event stream sequencer operatively coupled to the message gateway and a plurality of network elements hosting a plurality of accounts including the at least one first account and the at least one second account;
converting, by the event stream sequencer, the first electronic message to a time-accurate event stream by sequencing the first electronic message into a first part of the time-accurate event stream which is shared with at least the plurality of network elements;
receiving, by the event stream sequencer, second electronics messages from at least some of the plurality of network elements respectively;
converting, by the event stream sequencer, the second electronic messages to the time-accurate event stream by sequencing the second electronic messages into a second part of the time-accurate event stream which is shared with the plurality of network elements and the message gateway, wherein the second electronic messages comprise:
  a) a first clearance response generated in response to said first transaction request by the at least one first account indicating a first availability of the at least one first asset, and
  b) a second clearance response generated in response to said first transaction request by the at least one second account indicating a second availability of the at least one second asset;
generating, by the message gateway, a transaction response based on the first clearance response and the second clearance response, wherein the transaction response confirms the proposed trade to the matching engine only if the clearance responses indicate both the at least one first asset and the at least one second asset are available; and transmitting, by the message gateway, a third electronic message carrying the transaction response to the matching engine, wherein a second transaction request, identifying the first account and issued by the event stream sequencer subsequent to issuance of the first transaction request, is queued by the first account until (i) the first account receives the first clearance response generated by the second account, (ii) a predetermined time period elapses, or (iii) the first account receives the transaction response generated by the message gateway.

10. The method according to claim 9, wherein communications among the matching engine, the message gateway, the event stream sequencer, and the plurality of network elements are based on a predetermined messaging protocol which defines respective contents of the first electronic message, the second electronic messages, and the third electronic message.

11. The method according to claim 10, further comprising:
validating, by the message gateway, the first transaction request based on the predetermined messaging protocol.

12. The method according to claim 9, further comprising:
configuring the message gateway to cause it to respond to the matching engine with said transaction response within the predetermined time period after receiving said first transaction request.

13. The method according to claim 12, wherein the predetermined time period is shorter than ninety (90) seconds.

14. The method according to claim 9, wherein only those of the plurality of network elements associated with the at least one first account or the at least one second account respond to the first transaction request with clearance responses.

15. The method according to claim 9, wherein the at least one first account becomes committed to the proposed trade after (1) issuing at least one first clearance response indicating the at least one first asset as being available and (2) receiving at least one second clearance response issued by the at least one second account indicating the at least one second asset as being available.

16. The method according to claim 9, further comprising:
recording, in a distributed ledger based on a blockchain technology:
 (a) at least one message of the first electronic message, the second electronic messages, or the third electronic message; or
 (b) at least some content of the at least one message.

17. The method according to claim 16, further comprising:
triggering execution of a smart contract based on the recorded at least one message or the recorded at least some content in accordance with the blockchain technology.

* * * * *